(12) United States Patent
York

(10) Patent No.: US 6,744,165 B2
(45) Date of Patent: Jun. 1, 2004

(54) HIGH POWER PERMANENT MAGNET HYBRID ALTERNATOR ROTOR

(75) Inventor: Michael Timothy York, Chelsea, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/282,752

(22) Filed: Oct. 29, 2002

(65) Prior Publication Data

US 2004/0080235 A1 Apr. 29, 2004

(51) Int. Cl.[7] .............................. H02K 1/22; H02K 1/27
(52) U.S. Cl. ......................... 310/156.72; 310/156.68; 310/263
(58) Field of Search ................... 310/263, 156.66, 310/156.67, 156.68, 156.69, 156.71, 156.72, 156.73

(56) References Cited

U.S. PATENT DOCUMENTS

| | | | | |
|---|---|---|---|---|
| 5,306,977 A | * | 4/1994 | Hayashi | 310/192 |
| 5,483,116 A | * | 1/1996 | Kusasse et al. | 310/156.66 |
| 5,578,885 A | * | 11/1996 | Alford et al. | 310/181 |
| 5,579,885 A | * | 12/1996 | Hollis et al. | 198/345.1 |
| 5,747,913 A | * | 5/1998 | Amlee et al. | 310/156.66 |
| 5,793,143 A | * | 8/1998 | Harris et al. | 310/181 |
| 5,828,155 A | * | 10/1998 | Adachi et al. | 310/181 |
| 5,907,209 A | * | 5/1999 | Ishida | 310/263 |
| 5,925,964 A | * | 7/1999 | Kusase et al. | 310/263 |
| 5,969,459 A | * | 10/1999 | Taniguchi et al. | 310/263 |
| 5,973,435 A | * | 10/1999 | Irie et al. | 310/263 |
| 6,011,343 A | * | 1/2000 | Taniguchi | 310/263 |
| 6,013,968 A | * | 1/2000 | Lechner et al. | 310/263 |
| 6,037,695 A | * | 3/2000 | Kanazawa et al. | 310/263 |
| 6,043,632 A | * | 3/2000 | Maehara et al. | 322/28 |
| 6,172,444 B1 | * | 1/2001 | Puskas | 310/316.01 |
| 6,236,134 B1 | * | 5/2001 | Syverson | 310/181 |
| 6,307,297 B1 | * | 10/2001 | Bramson et al. | 310/263 |
| 6,311,383 B1 | * | 11/2001 | Umeda et al. | 310/263 |
| 6,333,582 B1 | * | 12/2001 | Asao et al. | 310/156.66 |
| 6,426,581 B1 | * | 7/2002 | York et al. | 310/263 |
| 2001/0000291 A1 | * | 4/2001 | York et al. | 310/263 |
| 2002/0005673 A1 | * | 1/2002 | Umeda et al. | 310/156.11 |

FOREIGN PATENT DOCUMENTS

EP 837 538 * 4/1998 ............ H02K/1/27

* cited by examiner

Primary Examiner—Burton Mullins
(74) Attorney, Agent, or Firm—Brinks Hofer Gilson & Lione

(57) ABSTRACT

A rotor assembly for an alternator includes an electrical wire defining an excitation winding. A first pole piece and a second pole piece each have a generally circular body defining an axis of rotation and an outer radial periphery. A plurality of pole fingers are spaced radially about and extend axially from the outer radial periphery of each pole piece parallel to the axis of rotation. Each pole piece includes a plurality of mounting surfaces spaced radially about the outer radial periphery between the pole fingers. A plurality of permanent magnets are positioned on the mounting surfaces. A plurality of straps include tabs extending there from which are fastened to the pole pieces to secure the permanent magnets to the mounting surfaces.

12 Claims, 4 Drawing Sheets

HIGH POWER PERMANENT MAGNET HYBRID ALTERNATOR ROTOR

FIELD OF INVENTION

The invention relates to an automotive electrical alternator, and particularly to an alternator having a rotor assembly of a hybrid design including permanent magnets mounted thereon.

BACKGROUND OF THE INVENTION

This invention is related to an electrical alternator, particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems; increasingly sophisticated power train control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

One method which has been used to increase the power output of conventional electric alternators is to mount one or more permanent magnets onto an outer surface of the rotor to produce a significantly stronger magnetic field. The combined effect of the permanent magnets and the wound field coil enables the machine to produce substantially more electrical power output. It is difficult, however, to secure the permanent magnets onto the rotor because the rotor rotates at speeds of up to 25,000 RPM and is exposed to various environmental conditions.

One method of securing the magnets onto the rotor is to lengthen the inter-meshing fingers of the pole pieces so that they extend outward over the magnets to hold the magnets onto the adjacent pole piece. This however adds stress to the fingers when the rotor is spinning rapidly which causes the fingers to flex outward into the gap between the rotor and the stator. The distance between the rotor and the stator is controlled very closely because the closer the rotor and stator are to one another, the higher the electrical power output will be. Flexation of the fingers outward will force the alternator to be designed with a larger gap which will reduce the power output of the alternator.

Further, the permanent magnets are generally brittle and require expensive grinding operations to meet size tolerances, thereby making it difficult and expensive to shape the permanent magnets in a manner that will allow the permanent magnets to be locked onto the rotor.

Therefore, there is a need for an alternator rotor assembly having permanent magnets mounted thereon to increase the power output of the alternator, wherein the permanent magnets are mounted onto the rotor in a way that does not affect the structural robustness of the rotor and does not require tight tolerances on the size and shape of the permanent magnets.

SUMMARY OF THE INVENTION

In a first aspect of the present invention, a rotor assembly includes first and second poles each having a plurality of pole fingers spaced radially about and extending axially from a periphery of the poles and a plurality of mounting surfaces spaced radially about and between the pole fingers. In the assembled condition, the pole pieces fit together such that the pole fingers interleave in the well known "claw-pole" configuration. Permanent magnets are positioned on the mounting surfaces and straps are provided to secure the permanent magnets to the pole pieces.

In another aspect of the present invention, each of the straps includes tabs extending therefrom which are welded to the pole pieces to secure the straps, with the permanent magnets held onto the mounting surfaces, to the pole pieces.

In another aspect of the present invention, each of the straps includes tabs extending therefrom and the first and second pole pieces include portions which are staked over onto the tabs to secure the straps, with the permanent magnets held onto the mounting surfaces, to the pole pieces.

In still another aspect of the present invention, each of the pole fingers of the first pole piece includes a distal end and extends between the pole fingers of the second pole piece, the distal ends being positioned over the mounting surfaces of the second pole piece and each of the pole fingers of the second pole piece includes a distal end and extends between the pole fingers of the first pole piece, the distal ends being positioned over the mounting surfaces of the first pole piece, the distal ends engaging the straps to further secure the permanent magnets onto the mounting surfaces.

In yet another aspect of the present invention the permanent magnets are secured to the straps with an adhesive.

In still another aspect of the present invention the straps are made from a non-magnetic material.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
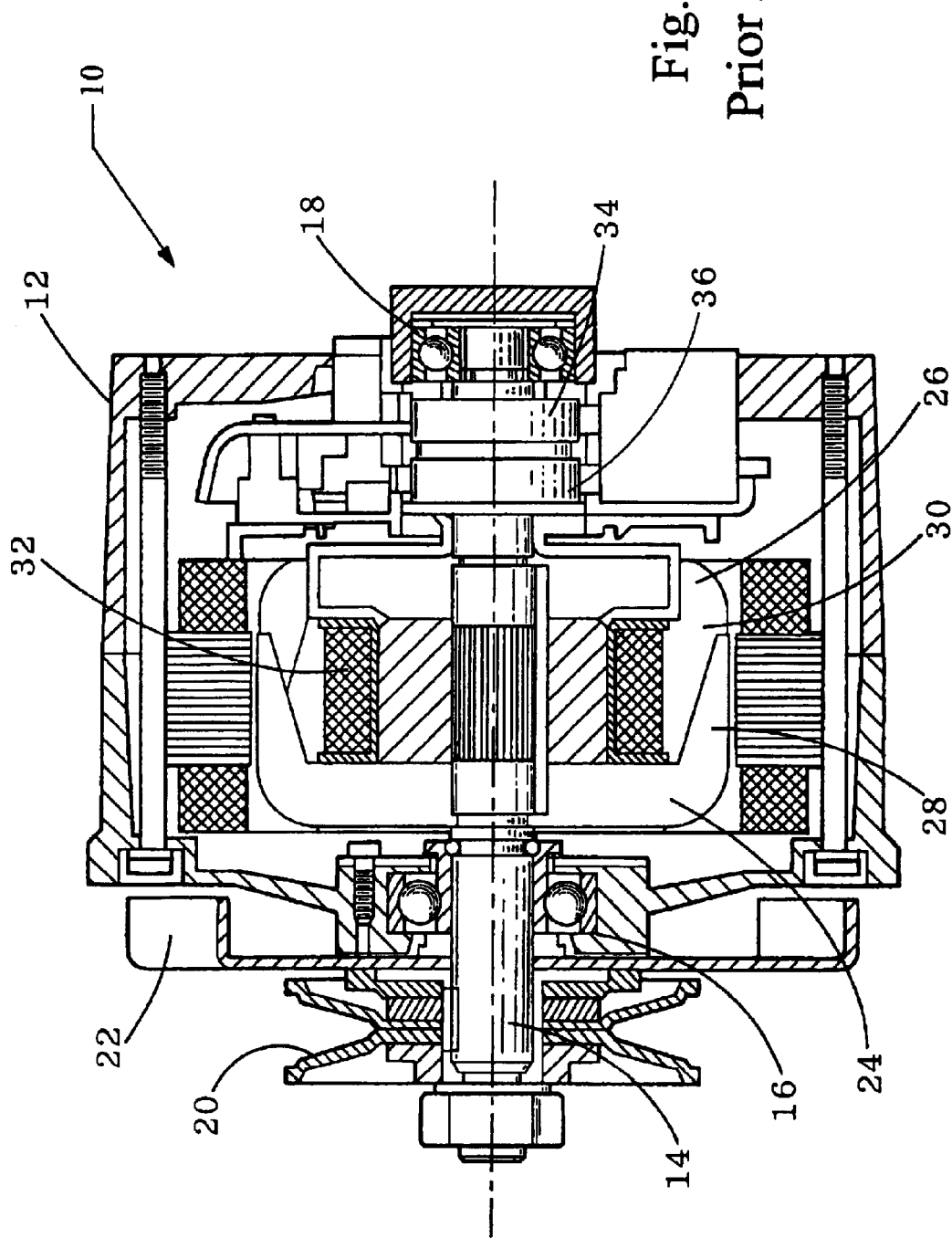
FIG. 1 is a cross sectional view of a typical prior art electrical alternator.

In order to provide a framework for a further detailed description of the preferred embodiments of this invention, FIG. 1 is presented illustrating a prior art electrical alternator configuration. That figure illustrates an electrical alternator 10 enclosed within a housing 12. An alternator rotor shaft 14 is supported by rolling element bearings 16 and 18 and a belt driven pulley 20 is fastened to the protruding front end of the rotor shaft 14. Rotating with the shaft 14, a fan 22 provides cooling airflow for removing heat from the alternator 10. Front and rear alternator pole pieces 24 and 26, respectively, rotate with the shaft 14 and have extending claw fingers 28, 30, respectively. The claw fingers 28, 30 interlace to create the well known "claw pole" rotor configuration. An excitation winding 32 is carried within the cavity formed between the pole pieces 24, 26, and a DC excitation signal is applied to the excitation winding 32 through a pair of slip rings 34, 36, and associated brushes.

The pole pieces 24, 26, and the winding 32 constitute a rotor assembly 38, which produces an alternating polarity magnetic field that rotates with rotation of the rotor assembly 38. Although a DC excitation signal is applied to the winding 32, the interlacing of the alternating poles 24, 26 creates an alternating polarity magnetic field. This field is presented to the stator windings of a stationary core 40 located radially around the rotor assembly 38. The movement of the alternating polarity magnetic field presented by the rotor assembly 38 across the stator windings of the core 40 generates electricity in a well-known manner.

Electrical energy output by the electrical alternator 10 generated within the core 40 is directed to rectifying diodes (not shown), and perhaps further filtering and power conditioning devices, before being connected with the vehicle's electric distribution bus (also not shown). Sophisticated control systems, also known as voltage regulators, are used to apply an appropriate level of DC voltage to the excitation windings 32 to generate the desired RMS value of the outputted alternating current from the alternator 10, which can be in single phase or multi-phase form, depending on the winding design of the core 40.

Figure 2:
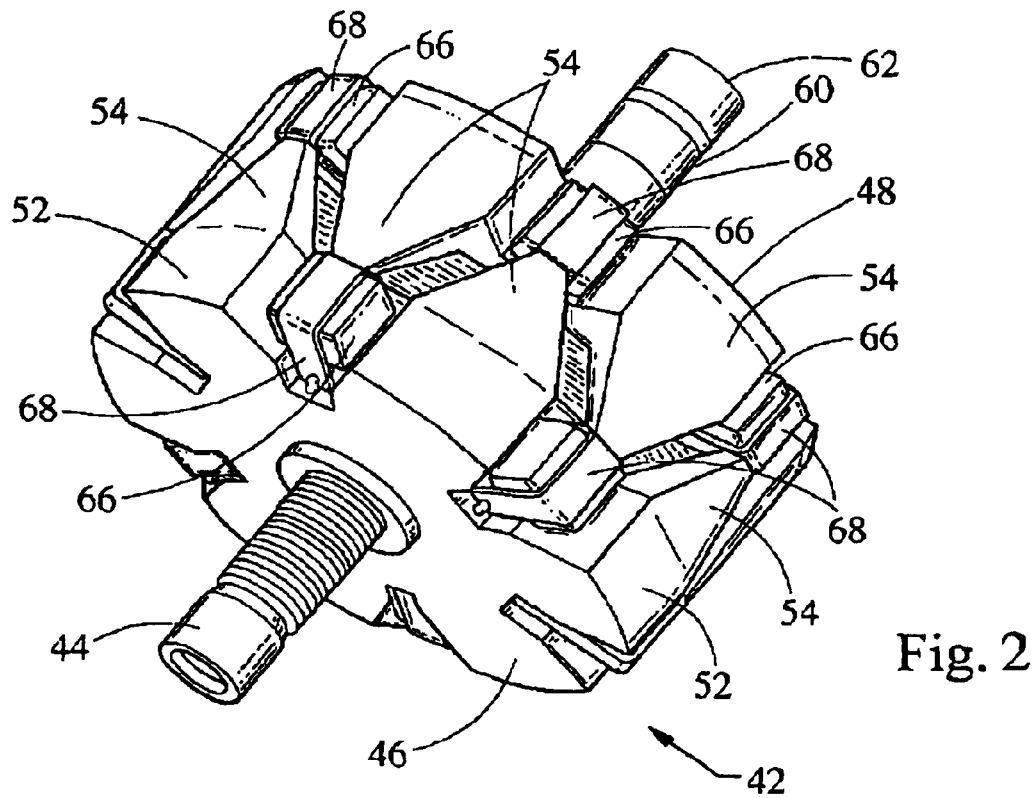
FIG. 2 is a perspective view of the rotor assembly shown with permanent magnets mounted thereon.

Now referring to FIG. 2, a rotor assembly of a first preferred embodiment is shown generally at 42. The rotor assembly 42 includes a rotor shaft 44 which is supported by rolling element bearings within a housing similar to the construct seen in FIG. 1. In the interest of clarity, such features have been omitted in FIG. 2. First and second pole pieces 46, 48, define an axis of rotation and an outer periphery 52. The first and second pole pieces 46, 48 rotate with the shaft 44. Pole fingers 54 are spaced circumferentially about and extend axially from the outer periphery 52 of the first and second pole pieces 46, 48, parallel to the axis of rotation 50. An excitation winding is carried on a bobbin within the cavity formed between poles 46, 48. A DC excitation signal is applied to the excitation winding through a pair of slip rings 60, 62 mounted onto the shaft 44, and through brushes associated therewith.

Figure 3:
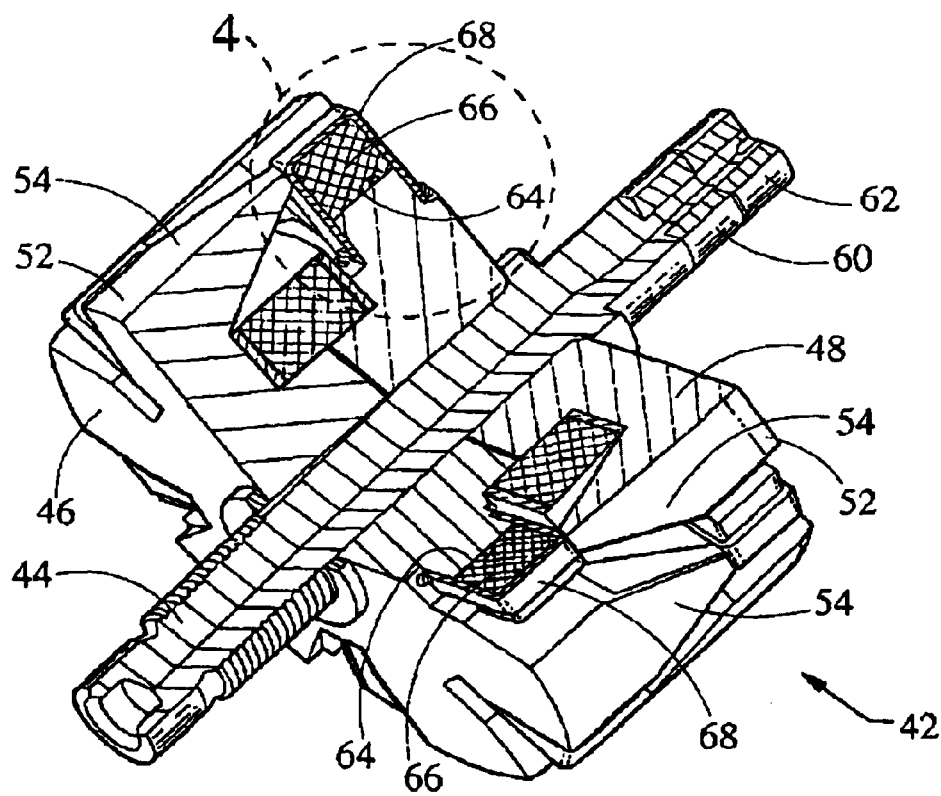
FIG. 3; is a partial sectional view of a first preferred embodiment where pole fingers do not extend over the straps.

The first and second pole pieces 46, 48 each further include a plurality of mounting surfaces 64 spaced radially about the outer periphery 52 and between the pole fingers 54. Permanent magnets 66 are placed at the periphery 52 of each of the first and second pole pieces 46, 48, wherein one of the permanent magnets 66 is positioned on each of the mounting surfaces 64 of the first and second pole pieces 46, 48 as shown in FIG. 3.

In the preferred embodiment, each of the permanent magnets 66 is secured to the pole pieces 46, 48 by a strap 68. Each of the straps 68 is adapted to be attached to the pole pieces 46, 48 to secure one of the permanent magnets 66 thereon. Preferably, the straps 68 are roughly as wide as the permanent magnets 66 such that the straps 68 substantially cover and protect the permanent magnets 66. However, straps 68 that are narrower or wider than the permanent magnets 66 can be used without departing from the scope of the present invention.

Preferably, the straps 68 are formed from plastic or from a nonmagnetic metal, however it is to be understood, that the straps 68 could be made from any material which would not provide a magnetic conduit from the north end of the permanent magnet 66 to the south end of the permanent magnet 66. Additionally, the straps 68 could be made from a magnetic metal as long as the straps 68 are thin. In such an instance, the thin magnetic straps 68 would provide a slight magnetic conduit which would reduce the power density of the alternator, but would otherwise work satisfactorily to secure the permanent magnets 66 onto the rotor assembly 42.

Figure 8:
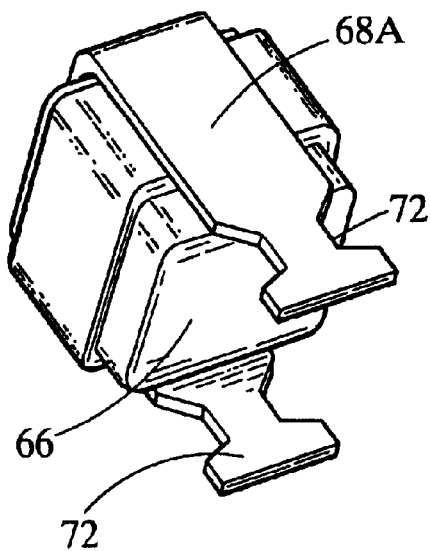
FIG. 8 is a perspective view similar to FIG. 7 wherein the tabs of the strap include notches.

The straps 68 further include tabs 72 extending from the sides. The tabs 72 of the straps 68 can be attached with an adhesive to the first and second pole pieces 46, 48. If the straps 68 are made from metal, then the tabs 72 can be welded onto the first and second pole pieces 46, 48, as shown by the welds 74 in FIG. 2. Referring to FIG. 8, the straps 68 can include tabs 72a that have notches 76 formed therein, such that portions (not shown) of the first and second pole pieces 46, 48 can be staked over onto the tabs 72a, thereby securing the straps 68 onto the first and second pole pieces 46, 48 and holding the permanent magnets 66 onto the mounting surfaces 64.

Figure 4:
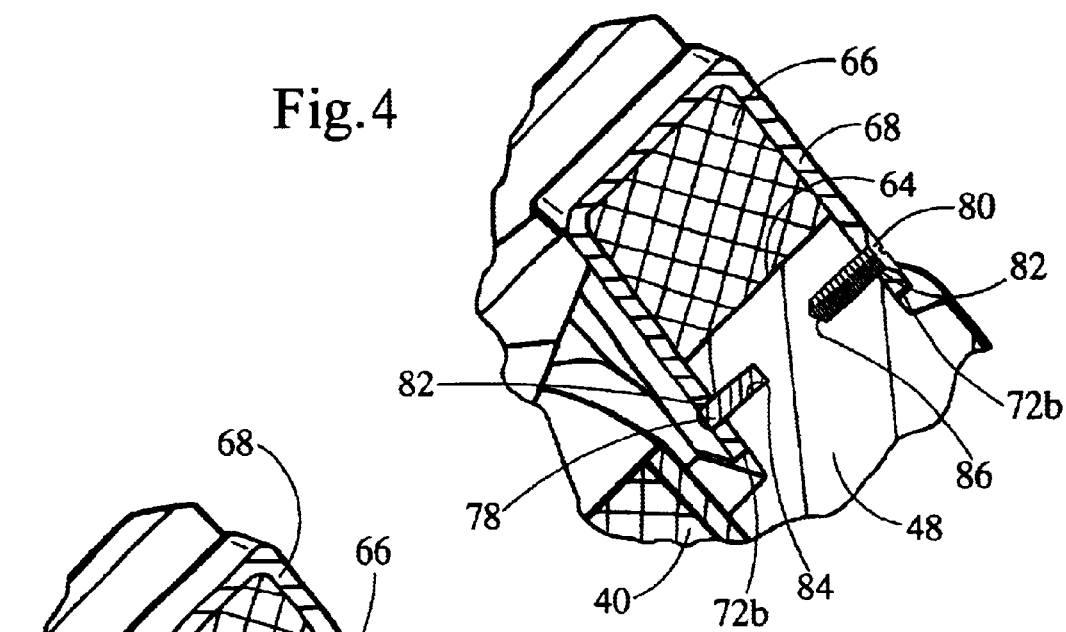
FIG. 4 is a close-up view of a portion of FIG. 3 showing tabs of the strap being attached by a pin and a threaded fastener.

Further, the straps 68 can be secured to the first and second pole pieces by attaching the tabs 72 with pins and screws. Referring to FIG. 4, one of the tabs 72b is attached to the pole piece 48 by a pin 78, and the other tab 72b is attached to the pole piece 48 by a threaded fastener 80. Preferably, a pin 78 is used to attach the tab 72b toward the center of the rotor assembly 42, because once the rotor assembly 42 is assembled, the (windings of the core 40)

excitation winding 32 will prevent the pin 78 from backing out, thereby keeping the tab 72b securely attached to the pole piece 48. Preferably, the tab 72b has a through hole 82 formed therein that is large enough to accommodate the pin 78, and the pole piece 48 has a bore 84 formed therein that is adapted to receive the pin 78. The pin 78 can fit loosely within the bore 84, or be press fit.

The tab 72b facing outward from the rotor assembly 42 will have nothing positioned to prevent a pin 78 from eventually loosening and falling out of a bore 84. Therefore, the tab 72b facing outward is attached by a threaded fastener 80, which is less likely to come loose. Preferably, the tab 72b includes a through hole 82 that is large enough to accommodate the threaded fastener 80 and the pole piece 48 has a threaded bore 86 formed therein that is adapted to receive and engage the threaded faster 80. The threaded fastener 80 could be a bolt, a screw, or other threaded fasteners.

Figure 5:
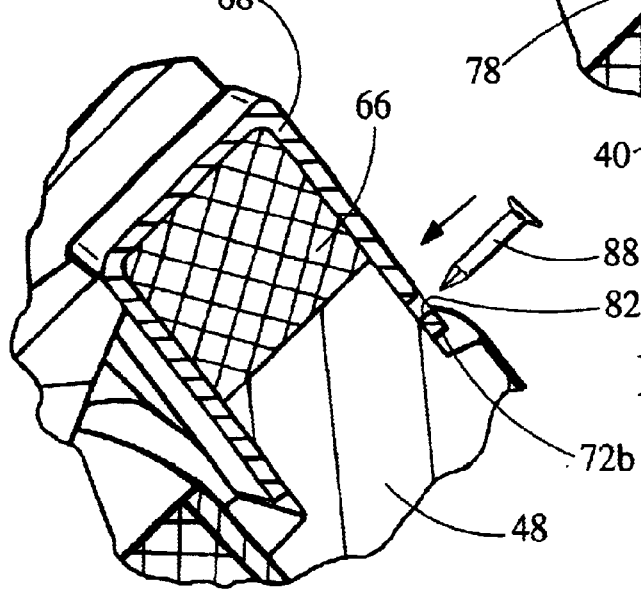
FIG. 5 is a close-up view similar to FIG. 4 illustrating how a nail is brought into position to the pole piece.
Figure 6:
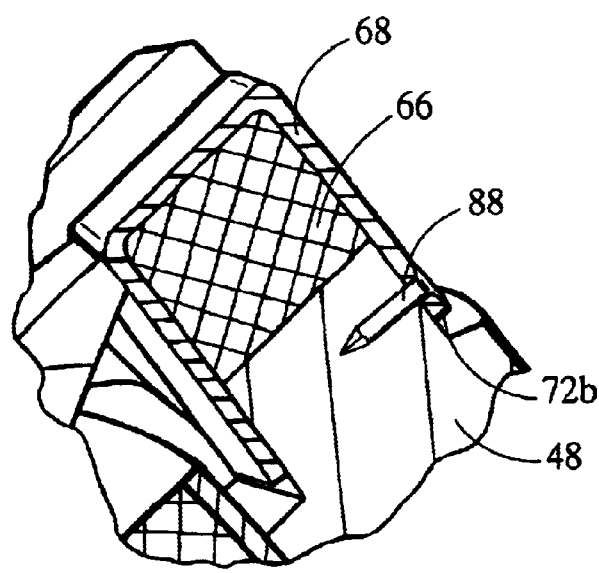
FIG. 6 is a close-up view similar to FIG. 5 showing the nail after being inserted into the pole piece.

Finally, the straps 68 can be secured to the pole piece 48 by a nail 88. Referring to FIGS. 5 and 6, the tabs 72b have through holes 82 formed therein that are large enough to accommodate a nail 88. The pole pieces 46, 48 are preferably made from a relatively soft material such as low carbon annealed steel, and the nails 88 are made from hardened steel. Because the nail 88 is made of hardened steel, the nail 88 can be forced into the softer material of the pole piece 48 and held there frictionally, thereby securing the tabs 72b to the pole piece 48.

It is to be understood, that each of the two tabs 72b of each strap 68 can be attached to the pole pieces 46, 48 by any one of the methods described, and any two tabs 72b of a particular strap 68 can be attached by different methods.

Figure 7:
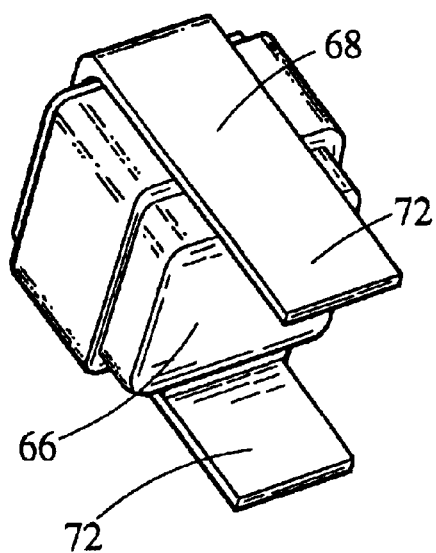
FIG. 7 is a perspective view of a permanent magnet placed within a strap prior to assembly to the alternator.

Referring to FIG. 4, preferably, the permanent magnets 66 are attached to the straps 68 by an adhesive prior to being mounted to the first and second pole pieces 46, 48. However, the straps 68 can be used without an adhesive as well. By using an adhesive, the amount of mechanical stress on the permanent magnets 66 due to vibration, mechanical loads, and other forces is reduced. Further, because the permanent magnet 66 is being held to the mounting surface 64 by the strap 68, tight tolerances of the permanent magnet 66 are not required. Preferably, as shown in FIG. 7, the magnet 66 includes a sleeve 90. Preferably, the sleeve 90 is made form a pliable material such as rubber or plastic, however, the sleeve 90 can also be made from metal. The sleeve 90 will allow the magnet 66 to have more dimensional variation, thereby making manufacturing easier.

Variances in the size and shape of the permanent magnet 66 can be compensated for by allowing clearance between the permanent magnet 66 and the strap 68. The clearance can then be filled with the adhesive used to secure the permanent magnet 66 to the strap 68. Therefore, the permanent magnets 66 can be made to large tolerances and will not require expensive grinding operations to manufacture, thereby lowering the cost of the permanent magnets 66 significantly. An adhesive including an epoxy resin is preferred, however, any adhesive suitable for the particular environment and conditions of the application could be utilized.

The straps 68 will also provide protection for the permanent magnets 66. Typically the permanent magnets 66 are very brittle, and the straps 68 will help prevent the permanent magnets 66 from being damaged as well and keeping chips or dislodged pieces of the permanent magnets 66 from flying off the rotor assembly 42 when the rotor assembly 42 is rotating at high speed.

Figure 9:
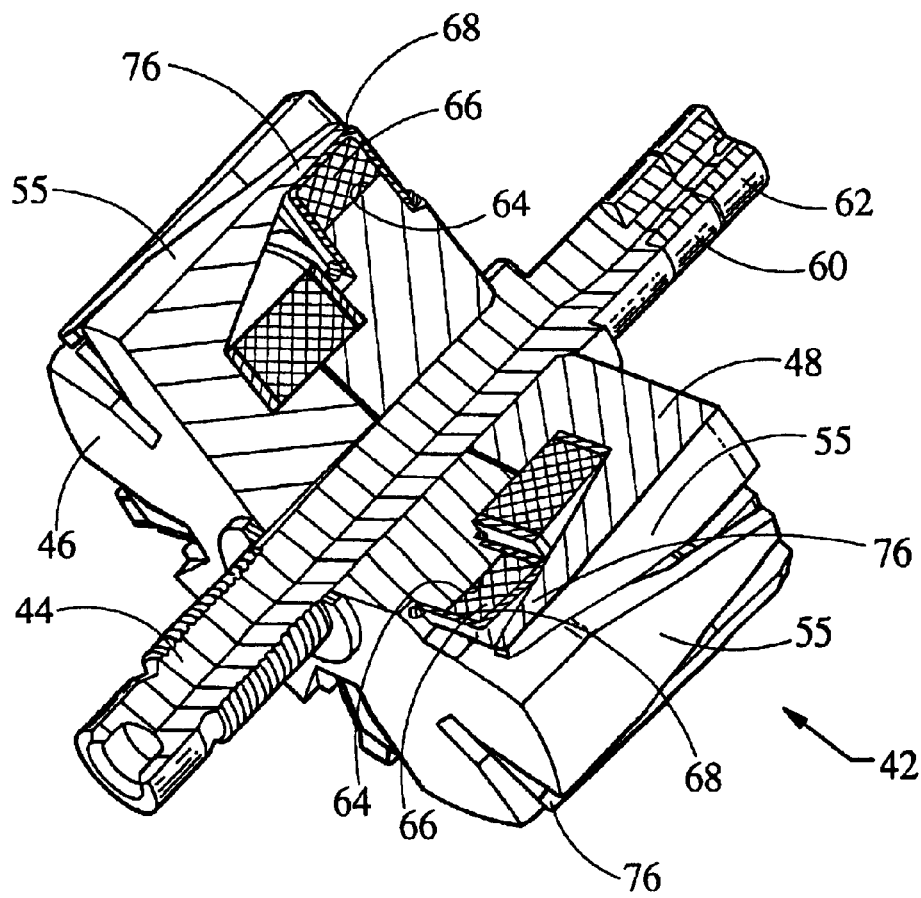
FIG. 9 is a partial sectional view of a second preferred embodiment where the pole fingers extend over and engage the straps.

Referring again to FIG. 3, in the first preferred embodiment, the pole fingers 54 of the first and second pole pieces 46, 48 do not extend over the mounting surfaces 64 of one another. Alternatively, as shown in FIG. 9, in a second preferred embodiment, pole fingers 92 of each of the first and second pole pieces 46, 48 extend over the mounting surfaces 64 and magnets placed thereon. The pole fingers 92 include distal ends 94 which will engage the straps 68 to provide additional force to hold the straps 68 and magnets 66 to the mounting surfaces 64. The additional support of the pole fingers 92 will allow the straps 68 to be designed less robust, or out of a lighter and weaker material than if the pole fingers 92 were not providing the additional support.

The pole fingers 92 of the second preferred embodiment will provide additional protection for the permanent magnets 66 and the presence of the staked or welded tabs 72 will prevent the straps 68 and permanent magnets 66 from putting outward stress on the pole fingers 92 which could cause the pole fingers 92 to deflect outward at high rotational speed of the rotor assembly 42. Without the risk of deflection, the air gap between the rotor and stator can be reduced, thereby increasing the power density of the alternator 10.

It is to be understood, that the permanent magnet retention described in the present invention could also be utilized in with an electric machine having a pure permanent magnet rotor or with armatures that do not contain wound fields.

While the above description constitutes the preferred embodiments of the present invention, it will be appreciated that the invention is susceptible to modification, variation and change without departing from the proper scope and fair meaning of the accompanying claims.

I Claim:

1. A rotor assembly for an alternator comprising:

a shaft defining an axis of rotation;

a first pole piece mounted onto said shaft and having an outer periphery;

a second pole piece mounted onto said shaft coaxial with said first pole piece, said second pole piece including an outer periphery;

an excitation winding positioned between said first and second pole pieces;

a plurality of first pole fingers circumferentially spaced about said periphery of said first pole piece and extending axially from said periphery generally parallel to said axis of rotation;

a plurality of second pole fingers circumferentially spaced about said periphery of said second pole piece and extending axially from said periphery generally parallel to said axis of rotation;

a plurality of permanent magnets positioned on said periphery of said first and second pole pieces and being located between adjacent ones of said fingers of said first pole piece and between adjacent ones of said fingers of said second pole piece; and a plurality of straps, each of said straps including tabs extending therefrom, said tabs being welded to said first and second pole pieces thereby securing one of said permanent magnets onto said periphery of one of said first and second pole pieces.

2. The rotor assembly of claim 1 further including and adhesive to adhesively attach said tabs to said fist and second pole pieces.

3. The rotor assembly of claim 1 wherein said permanent magnets are secured to said straps with an adhesive.

4. The rotor assembly of claim 1 wherein said straps are made from a nonmagnetic material.

5. The rotor assembly of claim 1 wherein said straps are made of metal.

6. A rotor assembly for an alternator comprising:

a shaft defining an axis of rotation;

a first pole piece mounted onto said shaft and having an outer periphery;

a second pole piece mounted onto said shaft coaxial with said first pole piece, said second pole piece including an outer periphery;

an excitation winding positioned between said first and second pole pieces;

a plurality of first pole fingers circumferentially spaced about said periphery of said first pole piece and extending axially from said periphery generally parallel to said axis of rotation;

a plurality of second pole fingers circumferentially spaced about said periphery of said second pole piece and extending axially from said periphery generally parallel to said axis of rotation;

a plurality of permanent magnets positioned on said periphery of said first and second pole pieces and being located between adjacent ones of said fingers of said first pole piece and between adjacent ones of said fingers of said second pole piece; and a plurality of straps, each of said straps including tabs extending therefrom, said tabs being attached to said pole pieces thereby securing one of said permanent magnets onto said periphery of one of said first and second pole pieces;

wherein at least one of said tabs includes a through hole and said pole pieces include a bore formed therein, said rotor assembly further including a pin positioned within said bore and engaging said through hole within said tab such that said strap is secured to said pole piece.

7. The rotor assembly of claim 6 wherein said pin fits loosely within said bore.

8. The rotor assembly of claim 6 wherein said pin is press fit within said bore.

9. A rotor assembly for an alternator comprising:

a shaft defining an axis of rotation;

a first pole piece mounted onto said shaft and having an outer periphery;

a second pole piece mounted onto said shaft coaxial with said first pole piece, said second pole piece including an outer periphery;

an excitation winding positioned between said first and second pole pieces;

a plurality of first pole fingers circumferentially spaced about said periphery of said first pole piece and extending axially from said periphery generally parallel to said axis of rotation;

a plurality of second pole fingers circumferentially spaced about said periphery of said second pole piece and extending axially from said periphery generally parallel to said axis of rotation;

a plurality of permanent magnets positioned on said periphery of said first and second pole pieces and being located between adjacent ones of said fingers of said first pole piece and between adjacent ones of said fingers of said second pole piece; and a plurality of straps, each of said straps including tabs extending therefrom, said tabs being attached to said pole pieces thereby securing one of said permanent magnets onto said periphery of one of said first and second pole pieces;

wherein at least one of said tabs includes a through hole and said pole pieces include a threaded bore formed therein, said rotor assembly further including a threaded fastener extending through said through hole and engaging said threaded bore within said pole piece such that said strap is secured to said pole piece.

10. A rotor assembly for an alternator comprising:

a shaft defining an axis of rotation;

a first pole piece mounted onto said shaft and having an outer periphery;

a second pole piece mounted onto said shaft coaxial with said first pole piece, said second pole piece including an outer periphery;

an excitation winding positioned between said first and second pole pieces;

a plurality of first pole fingers circumferentially spaced about said periphery of said first pole piece and extending axially from said periphery generally parallel to said axis of rotation;

a plurality of second pole fingers circumferentially spaced about said periphery of said second pole piece and extending axially from said periphery generally parallel to said axis of rotation;

a plurality of permanent magnets positioned on said periphery of said first and second pole pieces and being located between adjacent ones of said fingers of said first pole piece and between adjacent ones of said fingers of said second pole piece; and a plurality of straps, each of said straps including tabs extending therefrom, said tabs being attached to said pole pieces thereby securing one of said permanent magnets onto said periphery of one of said first and second pole pieces;

wherein at least one of said tabs includes a through hole, said rotor assembly further including a nail extending through said through hole and into said pole piece to frictionally engage said pole piece such that said strap is secured to said pole piece.

11. A rotor assembly for an alternator comprising:

a shaft defining axis of rotation;

a first pole piece mounted onto said shaft and having an outer periphery;

a second pole piece mounted onto said shaft coaxial with said first pole piece, said second pole piece including an outer periphery;

an excitation winding positioned between said first and second pole pieces;

a plurality of first pole fingers circumferentially spaced about said periphery of said first pole piece and extending axially from said periphery generally parallel to sail axis of rotation;

a plurality of second pole finger circumferentially spaced about said periphery of said second pole piece and extending axially from said periphery generally parallel to said axis of rotation;

a plurality permanent magnets positioned on said periphery of said first and second pole pieces and being located between adjacent ones of said fingers of said first pole piece and between adjacent ones of said fingers of said second pole piece; and a plurality of straps, each of said straps securing one of said permanent magnets onto said periphery of one of said first and second pole pieces;

wherein said first pole fingers each include a distal end extending to a position located over said permanent magnets mounted onto said second pole piece and said second pole fingers each include a distal end extending to a position located over said permanent magnets mounted onto said first pole piece.

12. The rotor assembly of claim 11 wherein said distal ends engage said straps to further secure said permanent magnets onto said first and second pole pieces.

* * * * *

UNITED STATES PATENT AND TRADEMARK OFFICE
CERTIFICATE OF CORRECTION

PATENT NO. : 6,744,165 B2
DATED : June 1, 2004
INVENTOR(S) : Michael Timothy York It is certified that error appears in the above-identified patent and that said Letters Patent is hereby corrected as shown below:

Column 6,
Line 61, delete "nonmagnetic" and substitute -- non-magnetic -- in its place.

Column 8,
Line 4, after "parallel to" delete "sail" and substitute -- said -- in its place.

Signed and Sealed this

Twenty-first Day of December, 2004

JON W. DUDAS
*Director of the United States Patent and Trademark Office*